3,312,740
PROCESS FOR PREPARING OXAMIDE
John J. Godfrey, Silver Spring, Md., assignor to W. R. Grace & Co., New York, N.Y., a corporation of Connecticut
No Drawing. Filed Dec. 16, 1963, Ser. No. 330,632
3 Claims. (Cl. 260—561)

The present invention relates to the production of oxamide and more specifically to an improved method for carrying out the dehydration of diammonium oxalate to oxamide.

It is known that diammonium oxalate when strongly heated to a temperature on the order of 200° C. dehydrates to form oxamide. It is also known that this dehydration reaction is catalyzed by the presence of an acidic-phosphorous compound such as phosphorous pentoxide, monosodium phosphate, and mono and diammonium phosphate. U.S. Patent 2,646,448 to Joffe et al., for example discloses a process wherein a substantially dry granular mixture of diammonium oxalate and acid phosphorous compound is heated in a pyrolysis tube for extended periods to obtain reasonably good yields of oxamide.

While prior processes result in satisfactory yields of oxamide when practiced on a small laboratory scale, it is frequently found that the large scale pyrolysis of dry granular diammonium oxalate is attended by numerous difficulties. Uniform heat transfer and temperature control as well as the handling of large amounts of solids at high temperatures is difficult. Plugging and caking of pyrolysis equipment is common. These difficulties frequently result in overheating of the material and loss of product through undue thermal degradation.

It is therefore an object of the present invention to provide an improved method for dehydrating diammonium oxalate to form oxamide.

It is another object to provide a method whereby diammonium oxalate may be uniformly heated to form good yields of oxamide substantially without the formation of undesired thermodegration products and caking of the reactants.

These, and still further objects of the present invention will become readily apparent to one skilled in the art with the following detailed description and specific examples.

Broadly, the present invention contemplates an improved method for pyrolyzing diammonium oxalate to form oxamide which involves heating a slurry of particulate diammonium oxalate and an acid-phosphorous catalyst in an inert liquid reaction medium to a temperature of from about 180 to about 200° C. to drive off water from the diammonium oxalate, and recovering the oxamide formed thereby. Preferably, the pyrolysis mixture is maintained under an atmosphere of ammonia during the heating operation.

More specifically, I have found that superior yields of oxamide may be obtained by the pyrolysis of diammonium oxalate if the pyrolysis mixture is maintained as a slurry in an inert relatively high boiling liquid reaction medium having a boiling point in the range of from about 180 to about 200° C. I have also found that the yield of oxamide prepared by my method may be further enhanced if the pyrolysis mixture is maintained under an atmosphere of ammonia. It appears that the presence of an ammonia atmosphere discourages the disassociation of the diammonium oxalate to ammonia and oxalic acid and thereby enhances the conversion to oxamide.

The diammonium oxalate of commerce which contains one molecule of water of hydration is completely satisfactory for the practice of the present invention. The purity of the diammonium oxalate need only be that of the generally commercially available product.

As indicated above, our pyrolysis is carried out in the presence of an acid phosphorous catalyst. Preferably, the catalyst is either mono or diammonium phosphate having the following respective formulae $$NH_4H_2PO_4 \text{ and } (NH_4)_2HPO_4$$

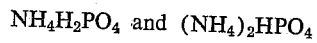

The catalyst, that is the acid phosphorous compound, is preferably in a finely divided particulate state similar to that of the diammonium oxalate. Generally speaking, it is found that from about 5 to about 10% by weight acid phosphorous catalyst based on the weight of the diammonium oxalate pyrolyzed will produce the desired catalytic effect. However, it is found that amounts ranging as low as about 1 to as high as about 50% catalyst may be used if desired. The rate of the reaction is dependent to a large extent on catalyst concentration. The amount actually used will depend both on the reaction rate desired and the nature of the product wanted in terms of phosphate content. In most cases the preferred amount of 5 to 10% by weight will give a reasonable reaction rate and yield a final product which does not contain an undue amount of phosphate. The inert liquid reaction medium which is used in the practice of the invention preferably has a boiling point in the order of from about 180 to about 200° C. The inert reaction medium may be inert cyclic and aliphatic hydrocarbons and halogenated hydrocarbons having the desired boiling point. Typical reaction media which may be used are tetralin, cis and trans-decalin, o-chlorobenzene, n-undecane and kerosene fractions boiling around 180° to 200° C. Solvents boiling in the above given range, when used in accordance with the present invention enable the reaction to be conveniently conducted under reflux conditions. Under conditions of reflux the water vapor which is formed during the pyrolysis is rapidly removed from the reaction zone. Water is readily removed from the reflux condensate by a simple gravity separation or absorption means before it is returned to the reaction mixture.

Sufficient inert reaction medium is used so as to produce a relatively fluid slurry with the solid reactants. Generally speaking, it is found that at least 1.5 parts by weight reaction medium per parts by weight solid reactants is required to produce a slurry having the desired physical characteristics. There is no maximum upper limit as to the amount of reaction medium which may be used, however little advantage is gained by using more than about 10 parts by weight medium per part of solid reactants.

The slurry which is used in the present pyrolysis is simply made by combining the reactants with the inert reaction media and subjecting the mixture to vigorous physical agitation. Once this mixture is formed, it is heated to the desired pyrolysis temperature.

When the present process is conducted on a batchwise basis the pyrolysis is continued until water ceases to evolve from the reaction mixture. This indicates that the diammonium oxalate has substantially been dehydrated to the desired oxamide. Using the above defined temperatures and combinations of reactant and catalyst, it is found that heating periods on the order of about 1 to 4 hours are sufficient to achieve substantial conversion of the diammonium oxalate to oxamide. The use of the above mentioned slurry enables the pyrolysis to be conducted in an orderly readily controlled manner. No caking and plugging of the reaction apparatus occurs, and water which is generated is uniformly and smoothly removed from the reaction zone by distillation.

In a preferred embodiment of the present invention, the reaction mixture is maintained under an atmosphere of ammonia. This ammonia atmosphere may be maintained at atmospheric pressure or slightly above during the course of the reaction. The presence of the ammonia atmosphere substantially enhances the yield of oxamide from a given amount of diammonium oxalate. It is reasoned that the presence of the ammonia discourages the disassociation of the diammonium oxalate to oxalic acid and ammonia which in turn reduces the yield of oxamide.

Subsequent to pyrolysis, the mixture is filtered to remove the solid oxamide which forms. The inert liquid reaction medium is substantially unaffected by the present process and may be recycled for re-use in further pyrolysis. The filtered oxamide may be conveniently extracted with water to remove the acid phosphorous catalyst and any non-reacted diammonium oxalate which may be present. Further drying of the oxamide under vacuum will yield a substantially pure high grade oxamide without any further purification steps.

Having described the basic aspects of the present invention, the following examples are given to illustrate embodiments thereof.

Example I

A one liter three neck flask was fitted with a thermometer, stirrer and water trap. The flask was charged with 268 grams of diammonium oxalate monohydrate, 500 ml. of tetralin and varying amounts of catalysts. The flask was heated with stirring to about 130° C., whereupon the water of hydration was collected. Further heating at 180 to 190° C. produced the water of amide formation. The heating was continued at 180° to 190° C. until water ceased to evolve from the reaction mixture. The reaction mixture was then allowed to cool to about room temperature and filtered. The filtered solid was extracted twice with 500 ml. portions of water by heating to near boiling, cooling to room temperature, and filtering. The oxamide thus prepared was vacuum dried.

Five runs using the above technique were made using various catalysts, varying amounts of catalyst, and in run #5 using an ammonia atmosphere, which was induced by passing a slow stream of ammonia under the surface of the reaction mixture. The results of these five runs are tabulated in the table set forth below.

TABLE

| Run | Catalyst | | Water Collected (percent of theory) | Oxamide Recovered (percent) |
|---|---|---|---|---|
| | Formula | Percent by Wt. | | |
| 1 | $NH_4H_2PO_4$ | 5 | 92 | 53 |
| 2 | $NH_4H_2PO_4$ | 10 | 97 | 65 |
| 3 | $(NH_4)_2HPO_4$ | 5 | 94 | 57 |
| 3 | $(NH_4)_2HPO_4$ | 10 | 99 | 63 |
| 5 | $(NH_4)_2HPO_4+NH_3$ | 10 | 100 | 82 |

The above example clearly indicates that good yields of oxamide may be obtained using the process set forth herein. The use of a liquid reaction medium in no way interferes with the production of oxamide through dehydration and at the same time produces a much easier to handle reaction mixture than using the conventional "dry" pyrolysis of diammonium oxalate. Furthermore, the use of an ammonium atmosphere during the reaction substantially increases the rate of reaction and enhances the desired oxamide formation.

I claim:
1. In a process for preparing oxamide by the pyrolysis of diammonium oxalate in the presence of an acidic phosphate catalyst, the improvement which comprises refluxing slurry of particulate diammonium oxalate and from about 5 to about 10% by weight of a compound selected from the group consisting of mono ammonium phosphate and and diammonium phosphate in a inert reaction media having a boiling point of from about 180 to about 200° C., separating water from said slurry substantially as it is formed, continuing said heating until water ceases to evolve from said reaction mixture and filtering said reaction mixture to obtain oxamide therefrom.

2. The method of claim 1, wherein at least 1.5 parts by weight of inert liquid reaction medium are present per part by weight of diammonium oxalate.

3. The method of claim 1, wherein said slurry is maintained in an atmosphere of ammonia.

References Cited by the Examiner

UNITED STATES PATENTS

| 1,582,675 | 4/1926 | Fick | 260—561 |
| 2,646,448 | 7/1953 | Joffe et al. | 260—561 |
| 2,677,706 | 5/1954 | Giachino | 260—561 |
| 3,013,018 | 12/1961 | Dickinson | 260—561 |

OTHER REFERENCES

MacArdle, The Use of Solvents in Synthetic Organic Chemistry, Van Nostrand, New York, 1925, pages 1–3.

Mitchell et al., Jour. Amer. Chem. Soc., vol. 53, page 1879 (1931).

WALTER A. MODANCE, *Primary Examiner.*

NATALIE TROUSOF, *Assistant Examiner.*